United States Patent [19]
Waits

[11] Patent Number: 5,245,448
[45] Date of Patent: Sep. 14, 1993

[54] APPARATUS FOR PRODUCING A MOVING 3-DIMENSIONAL IMAGE

[76] Inventor: Gregory D. Waits, 713 S. Anaheim Blvd., Anaheim, Calif. 92805

[21] Appl. No.: 851,073

[22] Filed: Mar. 13, 1992

[51] Int. Cl.$^5$ .................. G03H 1/26; H04N 11/00
[52] U.S. Cl. ................................. 359/4; 358/2; 359/25; 359/28
[58] Field of Search .............. 358/2; 359/4, 6, 22, 359/25, 26, 28, 9, 11, 21

[56] References Cited

U.S. PATENT DOCUMENTS

| | | | |
|---|---|---|---|
| 3,716,286 | 2/1973 | St. John | 359/12 |
| 3,720,921 | 3/1973 | Schools et al. | 359/4 |
| 3,807,849 | 4/1974 | Lobb | 359/15 |
| 3,813,685 | 5/1974 | St. John | 359/22 |
| 3,900,884 | 8/1975 | St. John | 359/22 |
| 4,007,481 | 2/1977 | St. John | 359/22 |
| 4,111,519 | 9/1978 | Gillis et al. | |
| 4,186,002 | 1/1980 | Heller et al. | 359/4 |
| 4,206,965 | 6/1980 | McGrew | |
| 4,339,168 | 7/1982 | Haines | |
| 4,484,219 | 11/1984 | Kirk | 359/4 |
| 4,498,740 | 2/1985 | Caulfield | |

OTHER PUBLICATIONS

Brookner, Eli, "Phased-Array Radars", Scientific American Magazine, May 1985, pp. 94 to 102.

Primary Examiner—Martin Lerner

[57] ABSTRACT

A moving holographic image is projected into three space by producing a series of slides or fixed holographic images in quick succession in a process similar to a conventional motion picture All of the slides are produced on a single photochromic surface in succession by writing on the surface with UV light. Each slide consists of a set of identical strip holograms positioned on the photochromic surface as an array. Each strip hologram is produced by creating a series of traces arranged side by side. As the maxima traverse the surface, the UV source is turned on and off according to a program to produce a series of dots of either unchanged or darkened color on the photochromic surface. During the next scan a new set of unchanged or darkened dots are produced on each strip hologram, and so on until the slide is completed. After being illuminated the surface is quickly washed clean in preparation for the next slide by illuminating it with a burst of high intensity UV light. The moving holographic image may be produced in full color by producing and illuminating each side in three versions in sequence, one each of the versions being illuminated by coherent light in each of the primary colors.

12 Claims, 1 Drawing Sheet

APPARATUS FOR PRODUCING A MOVING 3-DIMENSIONAL IMAGE

FIELD OF THE INVENTION

This invention relates generally to making of a hologram and more particularly to an apparatus and method for producing a moving 3-dimensional holographic image.

BACKGROUND OF THE INVENTION

The techniques of phased-array radars are well known in the literature. Typically, antenna elements in such a radar emit separate microwave signals. When all the elements radiate precisely in phase, yielding wave crests that move forward in step, the waves become superimposed along the perpendicular axis of the array. They interfere constructively to produce a strong sum signal, resulting in a beam directed straight ahead. If the signals from each of the radiating elements are delayed electronically by amounts that increase steadily across the face of the array, the delays will cause a signal to lag a fraction of a wavelength behind the signal from an adjacent element. This moves the constructive strong signal to one side. Thus, by changing the phase of the emitters the point of strongest signal can be steered. This technique is used in the present invention to steer a set of points of coherent light so that they may irradiate a photochromic surface along linear paths.

A U.S. patent to Gillis et al, U.S. Pat. No. 4,111,519 teaches an apparatus for recording and reading synthetic holograms. This apparatus describes a method for recording a byte of binary data as a synthetic Fourier transform hologram. A U.S. patent to Caulfied U.S. Pat. No. 4,498,740 describes an apparatus and method for writing a hologram from x, y, and z coordinates.

The above patents and the prior art in general does not show a method and apparatus for producing a motion picture using holographic images. The present invention, it is now believed, is unique in establishing the method for true motion imagery in holograpic processes.

SUMMARY OF THE INVENTION

A moving holographic image is projected into three space by producing a series of slides or fixed holographic images in quick succession in a process similar to a conventional motion picture. The moving holographic image is generated by producing a slide, illuminating it with coherent visible light for a short time, producing the next slide in the motion sequence and illuminating it, and so on. All of the slides are produced on a single photochromic surface in succession by writing on the surface with UV light. Each slide consists of a set of identical strip holograms positioned on the photochromic surface as an array. Each strip hologram is produced by creating a series of traces arranged side by side. The first traces for all of the strip holograms are produced simultaneously and identically by projecting a series of identical UV light beams in a common direction so that they produce interference maxima which are reflected by a scanning mirror onto the photochromic surface. As the maxima traverse the surface, the UV source is turned on and off at a very high rate in accordance with a program to produce a series of dots of either unchanged or darkened color on the photochromic surface. The sequence of dots make up the trace. During the next scan a new set of unchanged or darkened dots are produced on each strip hologram, and so on until the slide is completed. After being illuminated the surface is quickly washed clean in preparation for the next slide by illuminating the surface with a burst of high intensity UV light. The moving holographic image may be produced in full color by producing and illuminating each slide in three versions in sequence, one each of the versions being illuminated by coherent light in each of the primary colors.

There has not been a method until now to produce a true moving holographic image. The method and apparatus are simple in conception and construction. The use of constructive interference by a set of parallel, in phase light beams has not been used to produce a reflected scanning set of light points for writing onto a photochromic surface. The representation of a hologram by a series of individual traces, each trace written as a series of light and dark dots on a surface and the production of a high quality holographic image by the illumination of a quantity of identical holograms on the surface has the significant advantages of being able to be represented by a series of ones and zeros in a computer and to be managed digitally.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
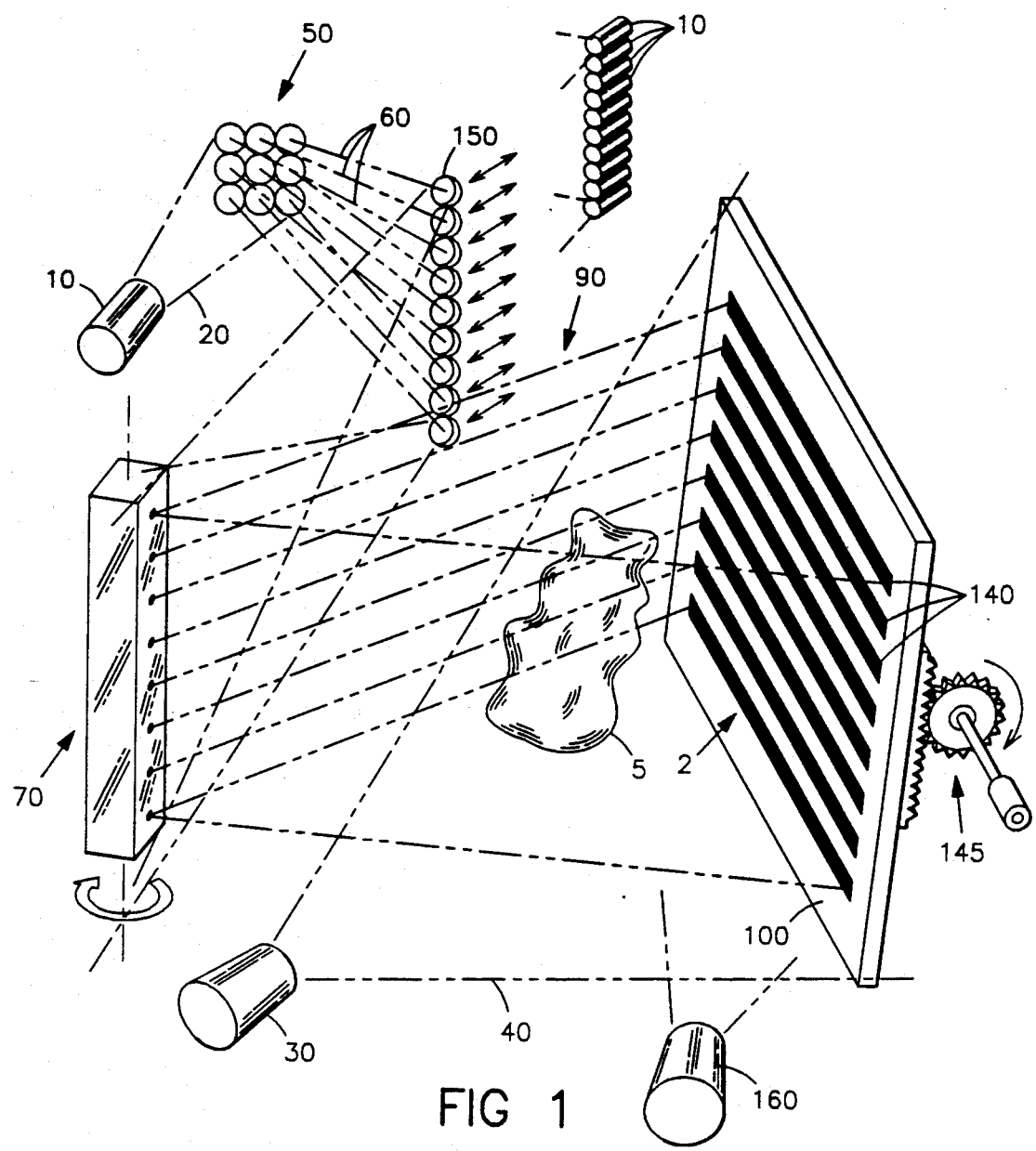
FIG. 1 is a diagram showing the apparatus and method of producing interference maxima from a series of coherent light beams and projecting the maxima onto a surface for producing a hologram.
Figure 2:
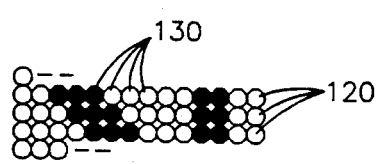
FIG. 2 is a detail of the typical construction of the traces which make up each strip hologram.

FIG. 1 and 2 show an apparatus for producing a moving 3-dimensional image 5. The apparatus has a source of coherent UV light 10 for projecting a first light beam 20, a source of coherent visible light 30 for projecting a second light beam 40, a means for splitting 50 the first light beam 20 into a plurality of wide angle of dispersion, derivative light beams 60, the splitting means 50 being positioned in the path of the first light beam 20 so that the derivative beams 60 are directed to move in a common plane in a common direction and in mutual wave phase synchronization. A scanning means 70 has a reflecting surface 80 for reflecting a narrow strip of the derivative light beams 60 to form a narrow strip reflected beam 90, the narrow strip reflected beam 90 thereby being caused to scan linearly in accordance with the scanning reflecting means 70. A photochromic surface 100, is normally light in color or transparent, the surface 100 becoming opaque in response to UV light of at least a predetermined intensity. The surface 100 is positioned to receive the scan of the narrow strip reflected beam 90. The reflected derivative light beams 60 produce optical interference with each other to produce a linear arrangement of light intensity maxima 110. The maxima 110 having a light intensity above the threshold of the photochromic surface 100, the maxima being transferred to the surface as part of the narrow strip reflected beam 90 by the scanning means 70 so that the surface 100 receives the maxima 110, the maxima 110 being scanned across the surface 100 linearly, each maxima 110 forming a trace 120 on the surface 100. The first beam 20 being turned on and off in accordance with a switching program as the maxima 110 are scanned across the surface 100 so that each trace 120 is made up of a series of transparent or opaque dots 130, the dark dots 130 being caused by the maxima 110 producing photochromic darkening on the surface 100 when the light beam 20 is on, while the transparent or light colored dots 130 are left unchanged photochromic surface area when the light beam 20 is off.

The maxima 110 are indexed to form subsequent traces 120, one adjacent to the next until a series of strip holograms 140 have been formed on the surface 100. The second beam 30 illuminates the strip holograms 140 to generate a single 3-dimensional image 5, while subsequent single 3-dimensional images 5 are formed on the surface 100 in the same way in rapid succession to generate apparent continuous motion of the 3-dimensional image 5.

Each maxima 110 must scan across the surface 100 a large number of times to produce a completed strip hologram 140. Typically the strip hologram 140 may be one millimeter high with each trace 120 being one micron high, so that one thousand traces 120 may be used to make up each strip hologram 140. The strip holograms 140 may be placed in contact with each other or may be placed so that a gap exists between each strip hologram 140.

The maxima 110 may be steered so that the traces 120 are positioned adjacent to each other in a sequence by one of two methods. The first method uses a means for moving the surface 100 upwardly or downwardly, as shown in FIG. 1, by an increment, after each subsequent trace 120 is completed, thereby allowing the next trace 120 to be placed adjacent to the previous trace 120. The alternate method is by providing means for changing the phase relationship 150 of the reflected derivative light beams 60 so that each next set of traces is written adjacent to the previous set of traces. Means 150 may be a set of linear mirrors having any mechanical means for moving the individual mirrors by a small amount to adjust the wave front of each individual beam so that the maxima 110 arrive at the scanning reflecting means 70 at a slightly different location and are thus transferred to the surface 100 adjacent to the previous trace 120.

An alternate embodiment, as also shown in FIG. 1 uses a series of coherent UV light sources to produce the maxima 110 directly.

Assuming that there is not enough time for the darkened dots 130 to fade back to a light color before it is desired to write the next strip hologram 140, then it is necessary to wipe the surface 100 clean after each set of strip holograms 140 are completed and illuminated. This can be accomplished by using a high powered source of UV light energy 160. The surface 100 is illuminated with a short pulse of the light from source 160 and the darkened dots 130 are immediately turned clear so that the surface is ready for the next set of traces in starting a new set of strip holograms.

In a further embodiment the holographic image is produced in full color. Each strip hologram 140 is written as before but in three versions. Each of the three versions having only those attributes in the finished holographic image that require coloration by one of the three primary colors. Each of the three versions when completed is illuminated in quick succession by coherent light of the respective primary color. The result is as if a single frame were produced in full color.

While the invention has been described with reference to several preferred embodiments, it is to be clearly understood by those skilled in the art that the invention is not limited thereto. Rather, the scope of the invention is to be interpreted only in conjunction with the appended claims.

I claim:

1. An apparatus for producing a moving 3-dimensional image, comprising:

a source of coherent UV light for projecting a first light beam;

a source of coherent visible light for projecting a second light beam;

a means for splitting the first light beam into a plurality of wide angle of dispersion, derivative light beams, the splitting means being positioned in the path of the first light beam so that the derivative beams are directed to move in a common plane in a common direction and in mutual wave phase synchronization;

a scanning means for reflecting a narrow strip reflected beam, the derivative light beams to form a narrow strip reflected beam, the narrow strip reflected beam thereby being caused to scan linearly in accordance with the scanning reflecting means;

a photochromic surface, the surface being normally transparent, the surface becoming opaque in response to UV light of at least a predetermined intensity threshold thereon, the surface positioned to receive the scan of the narrow strip reflected beam;

the reflected derivative light beams producing optical interference with each other to produce a linear arrangement of light intensity maxima, the maxima having a light intensity above the threshold of the photochromic surface, the maxima being transferred to the surface as part of the narrow strip reflected beam by the scanning means for reflecting so that the surface receives the maxima, the maxima scanning across the surface linearly, each maxima forming a trace on the surface;

the first beam being turned on and off in accordance with a switching program as the maxima are scanned across the surface so that each trace is made up of an identical series of transparent and opaque dots;

the maxima being indexed to form subsequent said traces one adjacent to the next until a series of strip holograms have been formed on the surface;

the second beam illuminating the strip holograms to generate a single 3-dimensional image, subsequent further said single 3-dimensional images being formed on the surface by the first light beam and being illuminated by the second beam in rapid succession to form the appearance of continuous motion of the 3-dimensional image.

2. The apparatus of claim 1 further including a means for changing the phase relationship of the reflected derivative light beams so that each next set of traces is written adjacent to the previous set of traces.

3. An apparatus for producing a moving 3-dimensional image, comprising:

a plurality of sources of coherent UV light for projecting a plurality of first light beams in a common plane in a common direction and in mutual wave phase synchronization;

a plurality of beam expanders each of the beam expanders fitted to one of the sources of UV light for expanding each of the first light beams so that each of the beams has a wide angle of divergence;

a source of coherent visible light for projecting a second light beam;

a scanning means for reflecting a narrow strip of the derivative light beams to form a narrow strip reflected beam, the narrow strip reflected beam thereby being caused to scan linearly in accordance with the scanning reflecting means;

a photochromic surface, the surface being normally transparent, the surface becoming opaque in response to UV light of at least a predetermined intensity threshold thereon, the surface positioned to receive the scan of the narrow strip reflected beam;

the reflected derivative light beams producing optical interference with each other to produce a linear arrangement of light intensity maxima, the maxima having a light intensity above the threshold of the photochromic surface, the maxima being transferred to the surface as part of the narrow strip reflected beam by the scanning means for reflecting so that the surface receives the maxima, the maxima scanning across the surface linearly, each maxima forming a trace on the surface;

the first beam being turned on and off in accordance with a switching program as the maxima are scanned across the surface so that each trace is made up of an identical series of transparent and opaque dots;

the maxima being indexed to form subsequent said traces one adjacent to the next until a series of strip holograms have been formed on the surface;

the second beam illuminating the strip holograms to generate a single 3-dimensional image, subsequent further said single 3-dimensional images being formed on the surface by the first light beam and being illuminated by the second beam in rapid succession to form the appearance of continuous motion of the 3-dimensional image.

4. The apparatus of claim 3 further including a means for changing the phase relationship of the plurality of first light beams so that each next set of traces is written adjacent to the previous set of traces.

5. The apparatus of claim 1 or claim 3 further including a means for indexing the surface after each next set of traces is completed so that a new set of traces is produced adjacent to each previous set of traces.

6. The apparatus of claim 1 or claim 3 further including a means for wiping the surface clean after each separate 3-dimensional image is produced.

7. A method for producing a moving 3-dimensional image, comprising the steps:

A) projecting a first light beam of coherent UV light;

B) projecting a second light beam of coherent visible light;

C) splitting the first light beam into a plurality of wide angle of dispersion, derivative light beams, so that the derivative beams are directed to move in a common plane in a common direction and in mutual wave phase synchronization to produce optical interference with each other to produce a linear arrangement of light intensity maxima;

D) reflecting and linearly scanning a narrow strip of the derivative light beams to form a scanning narrow strip reflected beam of the maxima onto a photochromic surface;

E) turned the first beam on and off in accordance with a switching program as the maxima are scanned across the surface to form a set of parallel traces, each trace being made up of an identical series of light and dark dots formed in reaction to the first beam such that when the first beam is in the off state, the surface remains unchanged as a light colored dot, and when the first beam is in the on state, the surface changes to a dark dot due to photochromic reaction to the UV energy of the first light beam;

F) indexing the position of the first beam on the surface to form subsequent said sets of traces one adjacent to the next until a series of strip holograms have been formed on the surface;

G) illuminating the strip holograms with the second light beam to generate a single 3-dimensional image;

H) repeating steps A-G many times in each second to produce a series of said single 3-dimensional images, the series of images forming a sequence of action in rapid succession to form the appearance of continuous motion of the 3-dimensional image.

8. The method of claim 7 wherein step F is accomplished by changing the phase relationship between the plurality of derivative light beams.

9. A method for producing a moving 3-dimensional image, comprising the steps:

A) projecting a plurality of first highly divergent light beams of coherent UV light, the beams being directed to move in a common plane in a common direction and in mutual wave phase synchronization to produce optical interference with each other to produce a linear arrangement of light intensity maxima;

B) projecting a second light beam of coherent visible light;

C) reflecting and linearly scanning a narrow strip of the derivative light beams to form a scanning narrow strip reflected beam of the maxima onto a photochromic surface;

D) turned the first beams on and off in accordance with a switching program as the maxima are scanned across the surface to form a set of parallel traces, each trace being made up of an identical series of light and dark dots formed in reaction to switching of the first beams such that when the first beams are in the off state, the surface remains unchanged as a light colored dot, and when the first beams are in the on state, the surface changes to a dark dot due to photochromic reaction to the UV energy of the first light beams;

E) indexing the positions of the first beams on the surface to form subsequent said sets of traces one adjacent to the next until a series of strip holograms have been formed on the surface;

F) illuminating the strip holograms with the second light beam to generate a single 3-dimensional image;

G) repeating steps A-G many times in each second to produce a series of said single 3-dimensional images, the series of images forming a sequence of action in rapid succession to form the appearance of continuous motion of the 3-dimensional image.

10. The method of claim 9 wherein step E is accomplished by changing the phase relationship between the plurality of first light beams.

11. The method of claim 7, step F or claim 9 step E wherein the surface is indexed after each next set of traces is completed so that a new set of traces is produced adjacent to each previous set of traces.

12. A method for producing a moving 3-dimensional image in full color, comprising the steps:

A) projecting a first light beam of coherent UV light;

B) splitting the first light beam into a plurality of wide angle of dispersion, derivative light beams, so that the derivative beams are directed to move in a common plane in a common direction and in mutual wave phase synchronization to produce optical interference with each other to produce a linear arrangement of light intensity maxima;

C) reflecting and linearly scanning a narrow strip of the derivative light beams to form a scanning narrow strip reflected beam of the maxima onto a photochromic surface;

D) turned the first beam on and off in accordance with a switching program as the maxima are scanned across the surface to form a set of parallel traces, each trace being made up of an identical series of light and dark dots formed in reaction to the first beam such that when the first beam is in the off state, the surface remains unchanged as a light colored dot, and when the first beam is in the on state, the surface changes to a dark dot due to photochromic reaction to the UV energy of the first light beam;

E) indexing the position of the first beam on the surface to form subsequent said sets of traces one adjacent to the next until a series of strip holograms have been formed on the surface, the strip holograms having only those attributes of the composition which have components requiring coloration with a first primary color;

F) illuminating the strip holograms with coherent light of the first primary color to produce a 3-dimensional holographic image in the first primary color;

G) repeating steps A-E to produce a second version of the same series of strip holograms having only those attributes of the composition which have components requiring coloration with a second primary color;

H) repeating step F with coherent light of the second primary color to produce a 3-dimensional holographic image in the second primary color;

I) repeating steps A-E to produce a third version of the same series of strip holograms having only those attributes of the composition which have components requiring coloration with a third primary color;

J) repeating step F with coherent light of the third primary color to produce a 3-dimensional holographic image in the third primary color, the steps A-J being completed fast enough to appear to the eye to be a single full color rendition of the strip hologram;

K) repeating steps A-J many times in each second to produce a series of single 3-dimensional color holographic images, the series of images forming a sequence of action that is illuminated rapidly enough to produce the appearance of continuous motion of the 3-dimensional color image.

* * * * *